United States Patent
Ishiga (10) Patent No.: US 7,945,111 B2
(45) Date of Patent: May 17, 2011

(54) IMAGE PROCESSING METHOD FOR ADAPTIVELY FILTERING IMAGE DATA

(75) Inventor: Kenichi Ishiga, Yokohama (JP)

(73) Assignee: Nikon Corporation, Tokyo (JP)

( * ) Notice: Subject to any disclaimer, the term of this patent is extended or adjusted under 35 U.S.C. 154(b) by 970 days.

(21) Appl. No.: 11/792,301

(22) PCT Filed: Dec. 15, 2005

(86) PCT No.: PCT/JP2005/023037
§ 371 (c)(1),
(2), (4) Date: Jul. 19, 2007

(87) PCT Pub. No.: WO2006/068025
PCT Pub. Date: Jun. 29, 2006

(65) Prior Publication Data
US 2008/0089601 A1    Apr. 17, 2008

(30) Foreign Application Priority Data
Dec. 20, 2004    (JP) .................................. 2004-367263

(51) Int. Cl.
*G06K 9/40*  (2006.01)
(52) U.S. Cl. ........................... 382/263; 348/606; 358/1.9
(58) Field of Classification Search .................. 382/263, 382/279
See application file for complete search history.

(56) References Cited

U.S. PATENT DOCUMENTS
| | | | |
|---|---|---|---|
| 5,708,693 A | 1/1998 | Aach et al. | |
| 2002/0186309 A1 | 12/2002 | Keshet et al. | |
| 2003/0053628 A1* | 3/2003 | Hirai et al. ................... | 380/210 |
| 2004/0001643 A1 | 1/2004 | Thesen | |

FOREIGN PATENT DOCUMENTS
| | | |
|---|---|---|
| JP | A-2004-536518 | 12/2004 |
| WO | WO 03/009231 A2 | 1/2003 |

OTHER PUBLICATIONS
Adaptive demosaicking Rajeev Ramanath and Wesley E. Snyder, J. Electron. Imaging 12, 633 (2003).*
Elad, "On the Origin of the Bilateral Filter and Ways to Improve It," *IEEE Transactions on Image Processing*, vol. 11, No. 10, Oct. 2002, pp. 1141-1151, IEEE Service Center, Piscataway, NJ.

(Continued)

*Primary Examiner* — Hadi Akhavannik
(74) *Attorney, Agent, or Firm* — Oliff & Berridge, PLC (57) ABSTRACT

An image processing method for filtering image data, which is constituted with a plurality of pixels, at each pixel position by using pixel values indicated by pixels present within a predetermined range containing a target pixel, includes: determining two arguments that are a first argument defined by a spatial distance from the target pixel and a second argument defined by a difference in signal intensity relative to the target pixel, in correspondence to each of the pixels present within the predetermined range; obtaining a weighting coefficient to be used when filtering each of the pixels present within the predetermined range, based upon a single integrated argument represented by a product of the first argument and the second argument; and filtering the image data by using a filter coefficient corresponding to the weighting coefficient having been obtained.

7 Claims, 6 Drawing Sheets

OTHER PUBLICATIONS

Perona et al., "Scale-Space and Edge Detection Using Anisotropic Diffusion," *IEEE Transactions on Machine Intelligence,* vol. 12, No. 7, Jul. 1990, pp. 629-639, IEEE Service Center, Los Alamitos, CA.
Apr. 27, 2010 Supplementary European Search Report issued in EP 05 816 871.7.
Tomasi et al., "Bilateral Filtering for Gray and Color Images," Proceedings of the 1998 IEEE International Conference on Computer Vision, Bombay, India.
Ranganath, "Image Filtering Using Multiresolution Representations," *IEEE Transactions on Pattern Analysis and Machine Intelligence,* vol. 13, No. 5, May 1991.
Choudhury et al., "The Trilateral Filter for High Contrast Images and Meshes," Eurographics Symposium on Rendering, pp. 1-11 (2003).
Chin et al., "Quantitative Evaluation of Some Edge-Preserving Noise-Smoothing Techniques," *Computer Vision, Graphics and Image Processing,* vol. 23, pp. 67-91 (1983).
Mastin, "Adaptive Filters for Digital Image Noise Smoothing: An Evaluation," *Computer Vision, Graphics and Image Processing,* vol. 31, pp. 103-121 (1985).
Pratt, *Digital Image Processing,* Second Edition, Chapter 10, pp. 285-322 (1991).

* cited by examiner

FIG. 5

IMAGE PROCESSING METHOD FOR ADAPTIVELY FILTERING IMAGE DATA

TECHNICAL FIELD

The present invention relates to an image processing method to be adopted to remove noise from image data.

BACKGROUND ART

There is an adaptive filter proposed in the related art that uses both the spatial distance and the pixel value difference as arguments in adaptive Gaussian blur (non-patent reference 1). The filter, which assumes the two arguments, is referred to as a bilateral filter. A similar filter is also disclosed in patent reference 1. Such a bilateral filter in the related art uses the product of a weighting coefficient determined by using the argument representing the pixel value difference alone and a weighting coefficient determined by using the argument representing the distance alone.
Patent reference 1: US Patent Application No. 2004/1643
Nonpatent reference 1: C. Tomasi et al. "Bilateral Filtering for Gray and Color Images," Proceedings of the 1998 IEEE International Conference of Computer Vision, Bombay, India

DISCLOSURE OF THE INVENTION

Problems to be Solved by the Invention

However, there is a concern with regard to the bilateral filters in the related art in that since the weighting coefficients are simply handled separately from each other in correspondence to the two arguments, noise and color artifacts, manifesting as projecting points or speckles, remain uncorrected along edges and over color boundary areas.

Means for Solving the Problems

According to the 1st aspect of the present invention, an image processing method for filtering image data, which is constituted with a plurality of pixels, at each pixel position by using pixel values indicated by pixels present within a predetermined range containing a target pixel, comprises: determining two arguments that are a first argument defined by a spatial distance from the target pixel and a second argument defined by a difference in signal intensity relative to the target pixel, in correspondence to each of the pixels present within the predetermined range; obtaining a weighting coefficient to be used when filtering each of the pixels present within the predetermined range, based upon a single integrated argument represented by a product of the first argument and the second argument; and filtering the image data by using a filter coefficient corresponding to the weighting coefficient having been obtained.

According to the 2nd aspect of the present invention, an image processing method for filtering image data, which is constituted with a plurality of pixels, at each pixel position by using pixel values indicated by pixels present within a predetermined range containing a target pixel, comprises: determining two arguments that are a first argument defined by a spatial distance from the target pixel and a second argument defined by a difference in signal intensity relative to the target pixel, in correspondence to each of the pixels present within the predetermined range; obtaining a weighting coefficient to be used when filtering each of the pixels present within the predetermined range, based upon the first argument and the second argument; determining the weighting coefficient by ensuring that $w(A1,B1)/w(A1,B2) \neq w(A2,B1)/w(A2,B2)$ is true with A1 and A2 representing different values taken for the first argument, B1 and B2 representing different values taken for the second argument, and w(An,Bn) representing the weighting coefficient being obtained; and filtering the image data by using a filter coefficient corresponding to the weighting coefficient having been obtained.

According to the 3rd aspect of the present invention, in the image processing method according to the 2nd aspect, it is preferred that the weighting coefficient is determined by ensuring that $w(A1,B1)/w(A1,B2) < w(A2,B1)/w(A2,B2)$ is true when $0 \leq A1 < A2$ and $0 \leq B1 < B2$.

According to the 4th aspect of the present invention, in the image processing method according to any one of the 1st through 3rd aspects, it is preferred that the first argument and the second argument are integrated with each other to constitute an argument in an exponential function expression representing a single Gaussian distribution.

According to the 5th aspect of the present invention, an image processing method for filtering image data V(vector r), which is constituted with a plurality of pixels, at each pixel position by using a pixel value V(vector r') corresponding to a pixel vector r' within a predetermined range containing a target pixel vector r, comprises: filtering the image data by executing arithmetic operation expressed as $$V'(\vec{r}) = \frac{\int V(\vec{r}') \cdot \exp\left\{-\frac{|V(\vec{r}') - V(\vec{r})|^2}{\sigma_{th}^2} \cdot \frac{|\vec{r}' - \vec{r}|^2}{r_{th}^2}\right\} d\vec{r}'}{\int \exp\left\{-\frac{|V(\vec{r}') - V(\vec{r})|^2}{\sigma_{th}^2} \cdot \frac{|\vec{r}' - \vec{r}|^2}{r_{th}^2}\right\} d\vec{r}'} \qquad \text{[Expression 1]}$$

with vector r=r with an arrow above, vector r'=r' with an arrow above, σth and rth respectively representing a constant and vector r indicating a coordinate position of the pixel.

According to the 6th aspect of the present invention, in the image processing method according to the 5th aspect, it is preferred that the predetermined range for filtering is integrated over a range approximately twice rth.

According to the 7th aspect of the present invention, in the image processing method according to any one of the 1st through 6th aspects, it is preferred that: when the image data are chrominance component data, the predetermined range is taken one-dimensionally and first filtering is executed along a one-dimensional direction for all target pixels; and after the first filtering is executed, the predetermined range is taken one-dimensionally along a direction perpendicular to the one-dimensional direction and second filtering is executed along the direction perpendicular to the one-dimensional direction for all the target pixels.

According to the 8th aspect of the present invention, in the image processing method according to any one of the 1st through 6th aspects, it is preferred that when the image data are luminance component data, the predetermined range is taken two-dimensionally and the filtering is executed for all target pixels.

According to the 9th aspect of the present invention, in the image processing method according to any one of the 1st through 6th aspects, it is preferred that when the image data are luminance component data, the filtering is executed on a high-pass component data of the luminance component data.

According to the 10th aspect of the present invention, in the image processing method according to any one of the 1st through 9th aspect, it is preferred that the filtering is executed in conjunction with a wavelet transformation coefficient resulting from wavelet transformation having been executed on the image data.

According to the 11th aspect of the present invention, an image processing method for filtering image data, which is constituted with a plurality of pixels, at each pixel position by using pixel values indicated by pixels present within a predetermined range containing a target pixel which assumes each pixel position, comprises: determining a first element defined by a spatial distance from the target pixel and a second element defined by a difference in signal intensity relative to the target pixel; and obtaining a weighting coefficient indicating a level of need for the target pixel to undergo a filtering operation, based upon the first element and the second element in correspondence to each of the pixels present within the predetermined range. And when the first element assumes a value substantially close to 0, the weighting coefficient is determined so that the target pixel undergoes the filtering operation regardless of the value assumed for the second element, and when the second element assumes a value substantially close to 0, the weighting coefficient is determined so that the target pixel undergoes the filtering operation regardless of the value assumed for the first element.

According to the 12th aspect of the present invention, a computer-readable computer program product comprises an image processing program that enables a computer or an image processing apparatus to execute image processing with an image processing method according to any one of the 1st through 11th aspects.

According to the 13th aspect of the present invention, in the computer program product according to the 12th aspect, it is preferred that the computer program product is a computer-readable recording medium having recorded therein the image processing program.

According to the 14th aspect of the present invention, an image processing apparatus comprises a control device that executes image processing with an image processing method according to any one of the 1st through 11th aspects.

Advantageous Effect of the Invention

The present invention adopting the structure described above achieves the following advantages. Since a weighting coefficient is generated based upon the two arguments allowed to influence each other, instead of generating separate weighting coefficients each in correspondence to one of the two arguments, an accurate decision as to whether or not filtering is necessary can be made. In addition, highly accurate noise removal can be executed without allowing any noise to remain uncorrected as projecting points.

BRIEF DESCRIPTION OF THE DRAWINGS

FIG. 1 The image processing apparatus achieved in an embodiment of the present invention FIG. 2 A flowchart of the image processing executed in a first embodiment FIG. 3 The relationship among the pixel value difference, the distance and the weighting coefficient observed in a bilateral filter in the related art FIG. 4 The relationship among the pixel value difference, the distance and the weighting coefficient observed in the bilateral filter in the first embodiment FIG. 5 A flowchart of the image processing executed in a second embodiment FIG. 6 Sub-band partition achieved through 5-stage wavelet transformation

BEST MODE FOR CARRYING OUT THE INVENTION

First Embodiment

Figure 1:
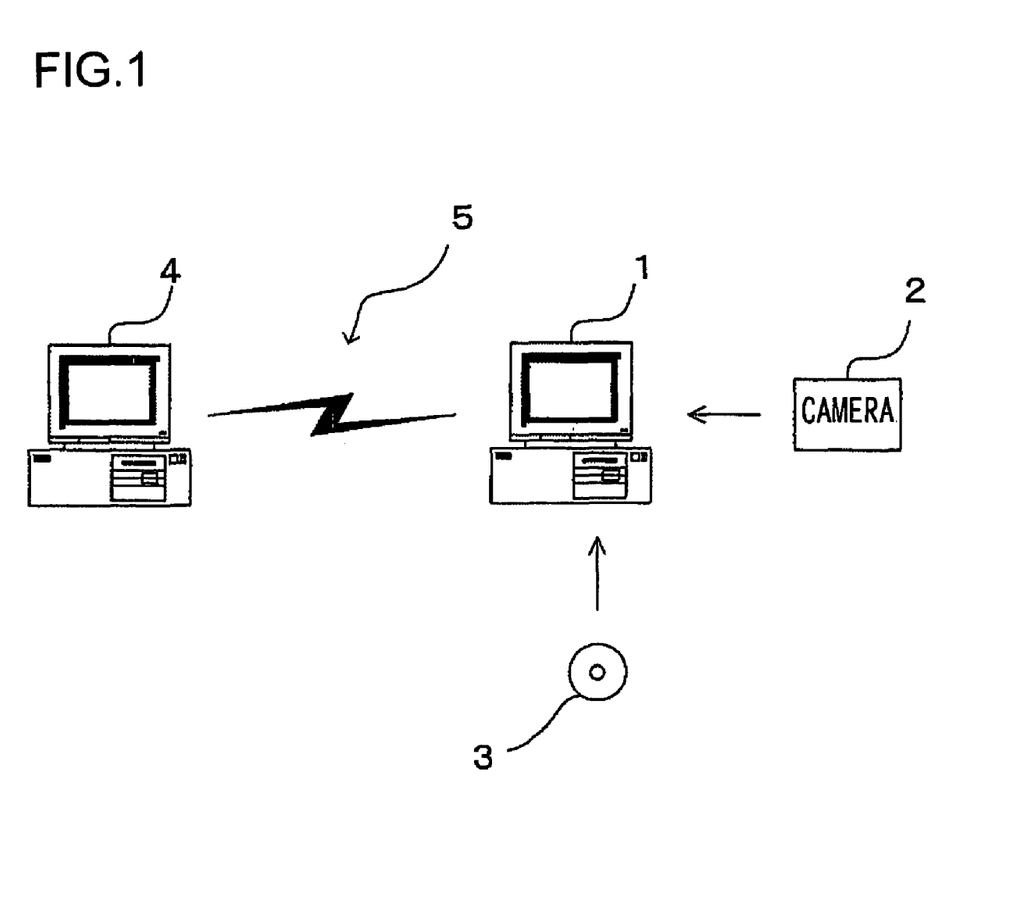

FIG. 1 shows the image processing apparatus achieved in an embodiment of the present invention. The image processing apparatus is constituted with a personal computer 1. The personal computer 1, which is connected with a digital camera 2, a recording medium 3 such as a CD-ROM, another computer 4 and the like, is able to receive various types of image data. The personal computer 1 executes the image processing to be explained below on the image data provided thereto. The personal computer 1 is connected to the computer 4 via an electronic communication network 5, which may be the Internet.

The program that enables the computer 1 to execute the image processing is provided in a recording medium such as a CD-ROM or by another computer via the Internet or another electronic communication network connected to the personal computer in a manner similar to that shown in FIG. 1, and the program thus provided is installed within the personal computer 1. The personal computer 1 comprises a CPU (not shown) and its peripheral circuits (not shown). The installed program is executed by the CPU.

The program to be provided via the Internet or another electronic communication network is converted to and transmitted as a signal on a carrier wave which is carried through the electronic communication network, i.e., a transmission medium. Namely, the program can be distributed as a computer-readable computer program product adopting any of various modes including a recording medium and a carrier wave.

Before describing the image processing executed in the embodiment, the problems of the related art are explained in further detail. The processing executed through a bilateral filter in the related art may be expressed as in (1) below.

[Expression 2]

$$V'(\vec{r}) = \frac{\int V(\vec{r}')\exp\left\{-\frac{|V(\vec{r}')-V(\vec{r})|^2}{\sigma_{th}^2}\right\}\exp\left\{-\frac{|\vec{r}'-\vec{r}|^2}{r_{th}^2}\right\}d\vec{r}'}{\int \exp\left\{-\frac{|V(\vec{r}')-V(\vec{r})|^2}{\sigma_{th}^2}\right\}\exp\left\{-\frac{|\vec{r}'-\vec{r}|^2}{r_{th}^2}\right\}d\vec{r}'} \quad (1)$$

r with an arrow above represents the vector (two-dimensional coordinates) of the processing target pixel and r' with an arrow above represents the vector (two-dimensional coordinates) of a pixel near the processing target pixel.

Namely, the filter assumes a weighting coefficient w represented by the product obtained by multiplying a weighting coefficient w_photo[V'−V] in the photometric term, in which the pixel value difference (V'−V) alone is used as an argument, by a weighting coefficient w_geometric[r'−r] in the geometric term, in which the distance (r'−r) alone is used as an argument. It is to be noted that the term "argument" may be regarded as synonymous with "variable" or "parameter".

$$w[V'-V][r'-r]=w\_photometric[V'-V]\times w\_geometric[r'-r] \quad (2)$$

Expression (1) may be rewritten as a general expression as follows:

[Expression 3]

$$V'(\vec{r}') = \frac{\int V(\vec{r}') w_{photometric}(V(\vec{r}'), V(\vec{r})) w_{geometric}(\vec{r}', \vec{r}) d\vec{r}'}{\int w_{photometric}(V(\vec{r}'), V(\vec{r})) w_{geometric}(\vec{r}', \vec{r}) d\vec{r}'} \quad (3)$$

$$w_{photometric}(V(\vec{r}'), V(\vec{r})) = \exp\left\{-\frac{|V(\vec{r}') - V(\vec{r})|^2}{\sigma_{th}^2}\right\}$$

$$w_{geometric}(\vec{r}', \vec{r}) = \exp\left\{-\frac{|\vec{r}' \cdot \vec{r}|^2}{r_{th}^2}\right\}$$

As the expression presented above indicates, there is a problem with such a bilateral filter in the related art in that since the weighting coefficients corresponding to the two arguments are handled separately, noise or color artifacts manifesting as projecting points remain uncorrected along edges or over color boundaries. Namely, situations in which the noise cannot be removed effectively occur readily since the processing tends to be affected by a factor attributable to either of the arguments alone.

For instance, over a color boundary area where the pixel value difference |V'−V| is assumed to increase abruptly, w_photometric [V'−V] assumes a drastically reduced value. As a result, regardless of how close to 1 the value assumed for w_geometric[r'−r] is, the value is disregarded and the noise initially present over the color boundary area cannot be removed.

The image processing method in the embodiment addresses these issues and provides an adaptive noise removal filter assuring a high level of image structure preservation by taking into consideration the two elements, i.e., the distance and the pixel value difference, in an integrated manner. Namely, it enables optimal noise removal while preserving the original image structure including edges and color boundaries. Such a noise removal technology is generally referred to as edge-preserving smoothing.

Figure 2:
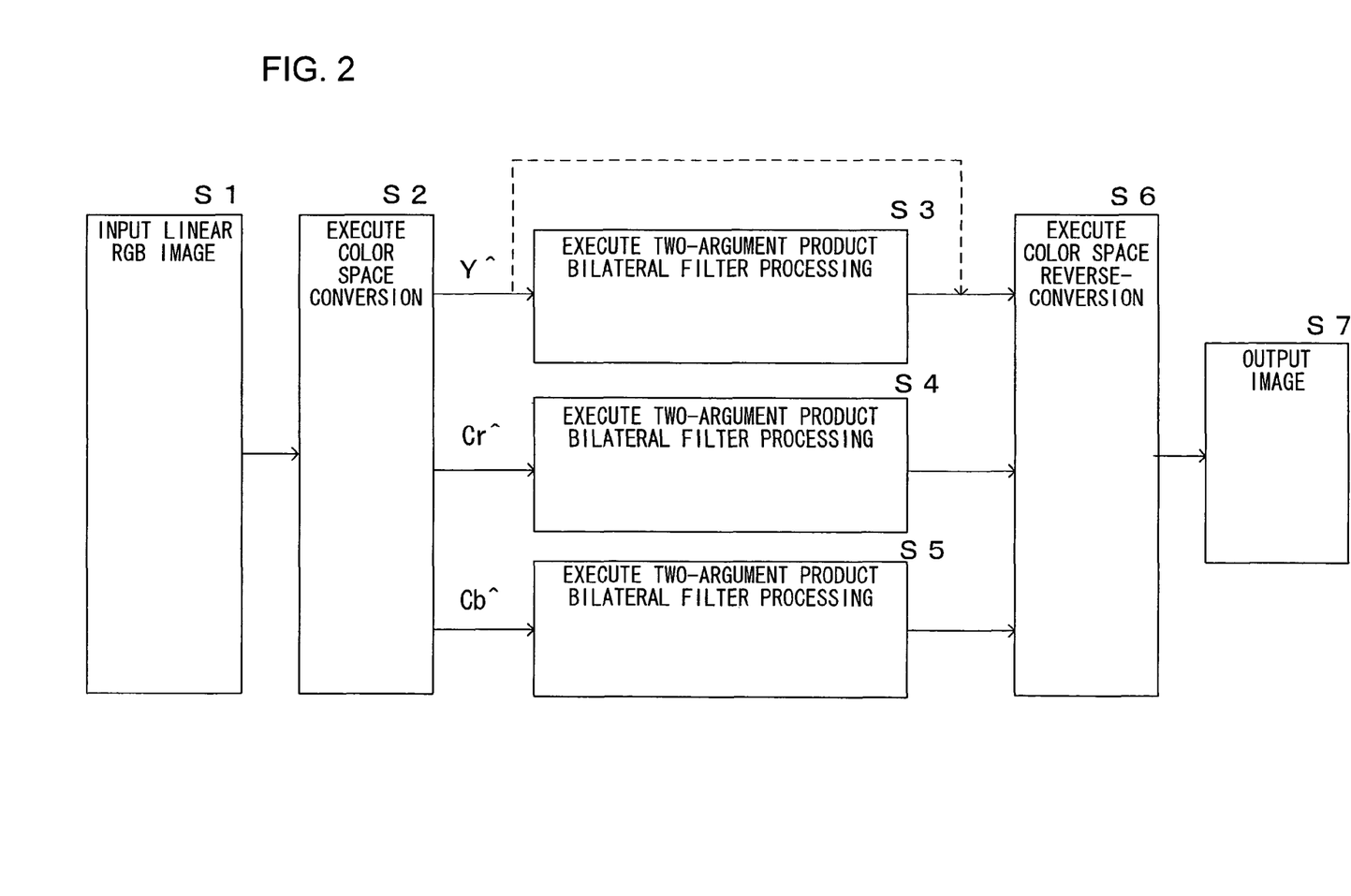

FIG. 2 presents a flowchart of the image processing executed by the personal computer 1 in the first embodiment. In step S1, linear RGB image data are input. In step S2, the input data are converted to a uniform noise color space Y^Cb^Cr^. In step S3, two-argument product bilateral filter processing is executed on the Y^ plane. In step S4, two-argument product bilateral filter processing is executed on the Cr^ plane. In step S5, two-argument product bilateral filter processing is executed on the Cb^ plane. In step S6, the color space is reverse-converted. In step S7, the image data, having undergone the processing are output. The following is a detailed explanation of the processing executed in each step.

(1) Image Data Input

The linear RGB image data input in step S1 are RGB colorimetric system data that express a linear gradation. The RGB calorimetric system data, which have been obtained by capturing an image with, for instance, an image sensor such as a CCD equipped with color filters disposed in a Bayer array, will have undergone various types of interpolation processing so that each pixel holds color information corresponding to the R component, the G component and the B component. Linear gradation data are gradation data achieving linearity relative to the light intensity, which assume color information values in proportion to the amount of received light. It is assumed that data having undergone gamma correction are converted back into the linear gradation data format before image processing. Such image data may be obtained by capturing an image with the digital camera 2 or another imaging device.

(2) (Color Space Conversion)

In step S2, the linear RGB image data having been input are converted to data in a uniform noise space where noise uniformity is achieved relative to the gradation. As a result, the data assumes a state that facilitates noise removal. Uniformity may be achieved for noise that includes shot noise and dark noise attributable to the sensor and the circuit system, by converting the RGB linear gradation image data, to which an offset signal is applied, to data achieving square root gradation characteristics. ε in the expression represents the offset signal.

[Expression 4]

$$R' = R'_{max} \frac{\sqrt{\frac{R}{R_{max}} + \varepsilon} - \sqrt{\varepsilon}}{\sqrt{1+\varepsilon} - \sqrt{\varepsilon}} \quad (4)$$

$$G' = G'_{max} \frac{\sqrt{\frac{G}{G_{max}} + \varepsilon} - \sqrt{\varepsilon}}{\sqrt{1+\varepsilon} - \sqrt{\varepsilon}} \quad (5)$$

$$B' = B'_{max} \frac{\sqrt{\frac{B}{B_{max}} + \varepsilon} - \sqrt{\varepsilon}}{\sqrt{1+\varepsilon} - \sqrt{\varepsilon}} \quad (6)$$

While the value assumed for ε varies depending upon the sensor in use, a value close to zero is taken when the ISO value is approximately 100 and a value approximately equal to 0.05 is taken when the ISO value is approximately 6400. It is to be noted that Patent Application No. 2004-200890 (submitted by the inventor of the present invention) discloses that when noise contains both shot noise and dark noise, a uniform noise space can be generated by applying an offset signal in correspondence to the dark noise level prior to the square root gradation conversion.

Then, luminance (brightness) and chrominance (color difference) signals Y^, Cb^ and Cr^ are generated as expressed below by using the data R', G' and B'.

$$Y^{\wedge} = (R' + 2G' + B')/4 \quad (7)$$

$$Cr^{\wedge} = R' - G' \quad (8)$$

$$Cb^{\wedge} = B' - G' \quad (9)$$

Since uniformity has been achieved with regard to the noise in the initial data R', G' and B' relative to the gradation, the luminance and chrominance signals Y^, Cb^ and Cr^ too, assume uniform noise characteristics relative to the gradation.

(3) Noise Removal Processing

In steps S3, S4 and S5, a noise removal filter expressed in (10) below is applied to the luminance signal Y^ and the chrominance signals Cb^ and Cr^ expressed in the uniform noise space.

[Expression 5]

$$V'(\vec{r}) = \frac{\int_{|\vec{r}'|\leq 2r_{th}} V(\vec{r}')\exp\left\{-\frac{|V(\vec{r}')-V(\vec{r})|^2}{\sigma_{th}^2}\cdot\frac{|\vec{r}'\cdot\vec{r}|^2}{r_{th}^2}\right\}d\vec{r}'}{\int_{|\vec{r}'|\leq 2r_{th}} \exp\left\{-\frac{|V(\vec{r}')-V(\vec{r})|^2}{\sigma_{th}^2}\cdot\frac{|\vec{r}'\cdot\vec{r}|^2}{r_{th}^2}\right\}d\vec{r}'} \quad (10)$$

It is to be noted that r with an arrow above (vector r) and r' with an arrow above (vector r') in the expression above, each representing a vector, indicate two dimensional positional coordinates. However, such vectors may be three-dimensional vectors if the image data are present in a three-dimensional space.

An unseparated weighting-type bilateral filter in which the weighting coefficient cannot be separated into the photometric term and the geometric term, instead of the separated weighting-type bilateral filter in the related art in which the weighting coefficient can be separated into the photometric term and the geometric term, is utilized as the noise removal filter in the embodiment. To explain this point in more specific terms, the bilateral filter in the related art assumes a weighting coefficient represented by the product of two exponential functions each assuming one of the two arguments as an exponent thereof. The filter used in the embodiment, on the other hand, assumes a weighting coefficient represented by a single exponential function in which the value indicated by the product of the two arguments is handled as a single exponent. By assuming an integration range that is approximately twice rth, the arithmetic operation can be executed by fully taking into consideration the processing requirement for the Gaussian skirt while minimizing the scale of the arithmetic operation.

This filter processing is individually executed on the Y^ plane, the Cr^ plane and the Cb^ plane. It is to be noted that the processing for the Y^ plane corresponding to the luminance signals may be skipped. The noise component includes the full range of frequency components, from short cycles to long cycles. In order to be able to remove color mottling noise manifesting over long cycles, rth should be set to approximately 20, i.e., the filtering size needs to match a pixel range of approximately 80×80 pixels. Even through such wide-range filtering, the noise can be removed effectively without destroying the image structure since the two factors, i.e., the pixel value difference and the spatial distance, are both taken into consideration In addition, the weighting coefficient is calculated only after executing the product of the two arguments, i.e., the pixel value difference and the distance. Thus, even when there is noise manifesting as projecting points, such as a color artifact, present over a steeply graded area, e.g., a color boundary area within the signal plane, the unseparated weighting-type filter in the embodiment, with the spatial distance argument made to favorably affect the pixel value difference argument ultimately generates a finite weighting coefficient so as to achieve effective noise removal, unlike the separated weighting-type filter in the related art, through which effective noise removal cannot be executed when a sudden decrease in the weighting coefficient in the photometric term becomes a dominant factor.

Furthermore, as the filter processing is executed over a wider distance range with the separated weighting-type filter in the related art, the filtering intensity is reduced drastically, which tends to allow color mottling noise over long cycles to remain as color artifacts. In contrast, the unseparated weighting-type filter in the embodiment sustains the desired filtering intensity level even when the distance between pixels is significant, as long as the pixel value difference does not exceed the extent of noise fluctuation and thus, is capable of clean noise removal.

σth should assume a value √2 times the standard deviation measured in the uniform noise space by photographing a uniform surface. In a uniform noise space, the standard deviation assumes a constant value regardless of the luminance level. Accordingly, the noise characteristics of the input image data can be profiled as a single representative value by using this standard deviation. Namely, the standard deviation measured in the uniform noise space of the uniform plane image data can be utilized as the representative value when evaluating the noise characteristics of the input image. The filter processing described above is executed by using this representative value. The use of such a filter is greatly facilitated in a uniform noise space. While σth will assume different values in correspondence to various sensors, σth will assume a value approximately equal to 1 in correspondence to an ISO value of approximately 100 and will take on a value of 10 to 15 in correspondence to an ISO value of approximately 6400, when there are 256 gradations.

The noise removal filter applied to the luminance component should be a two-dimensional filter since the color signal indicating the luminance component is extremely sensitive and needs to be handled with care. Namely, the filtering range in expression (10) should be a two-dimensional range. However, it is bound to take a great deal of time to process the data over such a large filtering range. Bearing this in mind, tests were conducted to confirm that the processing of the chrominance component data can be speeded up by approximation through two-stage processing by integrating one-dimensional processing executed along the x direction and one-dimensional processing executed along the y direction twice, without adversely affecting the image quality, i.e., without giving rise to any serious problems. Namely, the filtering range is first assumed one-dimensionally along the x direction and the filter processing is executed for target pixels. Next, the filtering range for the data having undergone the one-dimensional filter processing along the x direction is taken one-dimensionally along the y direction perpendicular to the x direction and the data are filtered along the y direction in correspondence to all the target pixels. This process may be as expressed in (11) and (12) below.

[Expression 6]

$$V'(x,y) = \frac{\int_{|x'|\leq 2r_{th}} V(x',y)\exp\left\{-\frac{|V(x',y)-V(x,y)|^2}{\sigma_{th}^2}\cdot\frac{|x'-x|^2}{r_{th}^2}\right\}dx'}{\int_{|x'|\leq 2r_{th}} \exp\left\{\frac{|V(x',y)-V(x,y)|^2}{\sigma_{th}^2}\cdot\frac{|x'-x|^2}{r_{th}^2}\right\}dx'} \quad (11)$$

$$V''(x,y) = \frac{\int_{|y'|\leq 2r_{th}} V'(x,y')\exp\left\{-\frac{|V'(x,y')-V'(x,y)|^2}{\sigma_{th}^2}\cdot\frac{|y'-y|^2}{r_{th}^2}\right\}dy'}{\int_{|y'|\leq 2r_{th}} \exp\left\{\frac{|V'(x,y')-V'(x,y)|^2}{\sigma_{th}^2}\cdot\frac{|y'-y|^2}{r_{th}^2}\right\}dy'} \quad (12)$$

(4) Color Space Reverse-Conversion

In step S6, the Y^Cb^Cr^ data are converted back to R'G'B' data and the R'G'B' data are further converted back to RGB data expressed based upon the initial linear gradation. The reverse-conversion may be executed by reversing the processing having been explained in reference to the expressions provided above.

(5) Image Output

In step S7, the image data from which the noise has been removed are output.

As described above, the image data in the linear gradation RGB color space are first converted to image data in a uniform noise space, which are then filtered for purposes of noise removal. Subsequently, the image data having undergone the noise removal are reverse-converted back to image data in the initial linear gradation RGB color space and are output as such.

Figure 3:
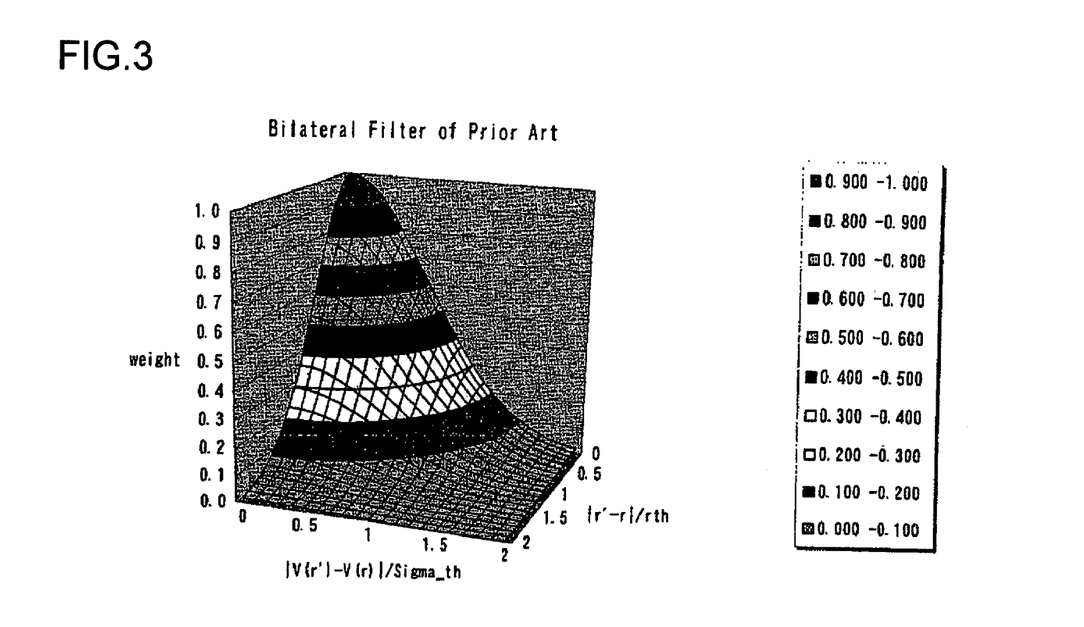
Figure 4:
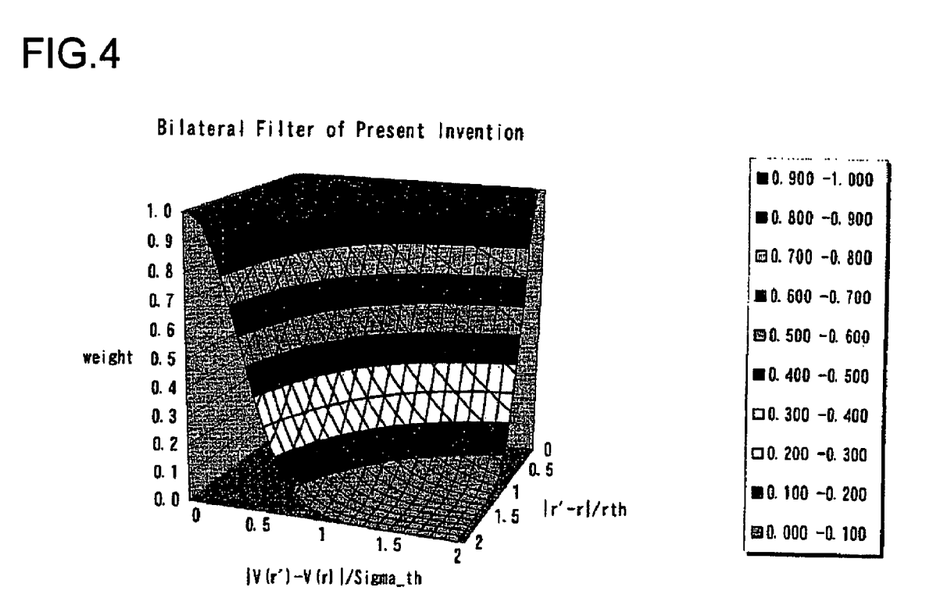

In reference to FIGS. 3 and 4, the advantages of the image processing method achieved in the embodiment are explained in further detail. FIG. 3 shows the relationship among the pixel value difference $|V(r')-V(r)|$, the distance $|r'-r|$ and the weighting coefficient weight, observed in the bilateral filter in the related art. FIG. 4 shows the relationship among the pixel value difference $|V(r')-V(r)|$, the distance $|r'-r|$ and the weighting coefficient weight, observed in the bilateral filter in the embodiment.

As explained earlier, the bilateral filter in the related art assumes a weighting coefficient represented by the product of two exponential functions each assuming one of the two arguments, i.e., the pixel value difference $|V(r')-V(r)|$ and the distance $|r'-r|$, as an exponent thereof. The filter used in the embodiment, on the other hand, assumes a weighting coefficient represented by a single exponential function in which the value indicated by the product of the two arguments, i.e., the pixel value difference $|V(r')-V(r)|$ and the distance $|r'-r|$, is handled as a single exponent. Namely, the two arguments, the pixel value difference $|V(r')-V(r)|$ and the distance $|r'-r|$ are integrated and together constitute an argument in an exponential function expression representing a single Gaussian distribution.

It is assumed that the pixel value difference $|V'-V|$ increases abruptly in a color boundary area. As FIG. 3 indicates, no matter how small the distance and how small a value $|r'-r|$ assumes, the weighting coefficient becomes reduced to a value insignificant enough to be disregarded as the pixel value difference $|V'-V|$ increases abruptly at the bilateral filter in the related art. This is bound to result in a situation in which the noise initially present over the color boundary area cannot be removed at all. In addition, as the distance $|r'-r|$ increases, the weighting coefficient becomes small enough to be disregarded even if the pixel value difference $|V'-V|$ is small. In such a case, color mottling noise manifesting over long cycles and the like cannot be removed readily.

In the bilateral filter achieved in the embodiment, on the other hand, the weighting coefficient assumes a value close to 1 and thus is not disregarded even when the pixel value difference $|V'-V|$ is large, as long as the distance $|r'-r|$ takes on a small value, as indicated in FIG. 4. In addition, even when the distance $|r'-r|$ is significant, the weighting coefficient takes on a value close to 1 and thus is not disregarded, as long as the pixel value difference $|V'-V|$ is small. Thus, projecting-point noise such as a color artifact manifesting over a very steep area within the signal plane, e.g., a color boundary area, color mottling noise manifesting over long cycles, and the like can be removed in an optimal manner.

It is to be noted that assuming that "An" represents the argument corresponding to the pixel value difference $|V(r')-V(r)|$, that "Bn" represents the argument corresponding to the distance $|r'-r|$, that $w(An,Bn)$ represents the weighting coefficient, that A1 and A2 represent different values taken for the argument "An" and that B1 and B2 represent different values taken for the argument "Bn", the following expression can be written for the filter processing shown in FIG. 3. The expression indicates that the rate of change in the weighting coefficient attributable to the argument B at the section taken at the argument value A1 and the rate of change in the weighting coefficient attributable to the argument B at the section taken at the argument value A2 are equal to each other with regard to the weighting coefficients determined in correspondence to argument values A1 and A2.

$$w(A1,B1)/w(A1,B2)=w(A2,B1)/w(A2,B2) \tag{13}$$

The following expression can be written with regard to the filter processing shown in FIG. 4. It indicates that the rate of change in the weighting coefficient attributable to the argument B at the section taken at A1 is different from the rate of change in the weighting coefficient attributable to the argument B at the section taken at A2 with regard to the weighting coefficients determined in correspondence to the argument values A1 and A2.

$$w(A1,B1)/w(A1,B2) \neq w(A2,B1)/w(A2,B2) \tag{14}$$

In addition, when $0 \leq A1 < A2$ and $0 \leq B1 < B2$ are true, the following expression is also true. Namely, as the value taken for A increases, the rate of change in the weighting coefficient attributable to the argument B, too, increases.

$$w(A1,B1)/w(A1,B2) < w(A2,B1)/w(A2,B2) \tag{15}$$

In the filter processing shown in FIG. 3, as the pixel value difference $|V(r')-V(r)|$ increases, the weighting coefficient w decreases exponentially even if the distance $|r'-r|$ is close to 0. As the distance $|r'-r|$ becomes larger, the weighting coefficient w decreases exponentially even if the pixel value difference $|V(r')-V(r)|$ is close to 0.

FIG. 4, on the other hand, indicates that when the pixel value difference $|V(r')-V(r)|$ is 0 or close to 0, the weighting coefficient w assumes the value of 1 or a value close to 1 even if the distance $|r'-r|$ is significant. In other words, the data undergo the filtering operation. In addition, the weighting coefficient w takes on the value of 1 or a value close to 1 when the distance $|r'-r|$ is 0 or close to 0 regardless of how large the pixel value difference $|V(r')-V(r)|$ is, and the data are thus designated to undergo the filtering operation.

Second Embodiment

Generally speaking, grainy features invisibility image texture cannot be corrected without lowering the resolution in noise removal on luminance component data. In addition, the bilateral filter processing in the first embodiment or another type of standard noise removal filter processing executed in the real space may lead to a further loss of luminance gradation. This point is also argued in non-patent reference 1 in relation to multiple usage of a bilateral filter in the real space.

Thus, the luminance component data should be handled with more care so as to retain the gradation characteristics by deliberately creating a high-pass component and executing noise removal processing on the created high-pass component. A wavelet transformation, which is ideal for these purposes, may also achieve much higher speed in the processing. Examples of noise removal methods adopting a wavelet transformation to achieve multiple resolutions include the technologies disclosed in reference material: "S. Ranganath, Image Filtering Using Multi-resolution Representations, IEEE Pattern Analysis and Machine Intelligence vol. 13, No. 5, May 1991, pp 426~440" and U.S. Pat. No. 5,708,693.

In the second embodiment, the luminance plane Y^ first undergoes wavelet transformation and then undergoes the unseparated weighting-type bilateral filter processing as in the first embodiment. The chrominance planes Cb^ and Cr^ undergo filter processing identical to that in the first embodiment.

Figure 5:
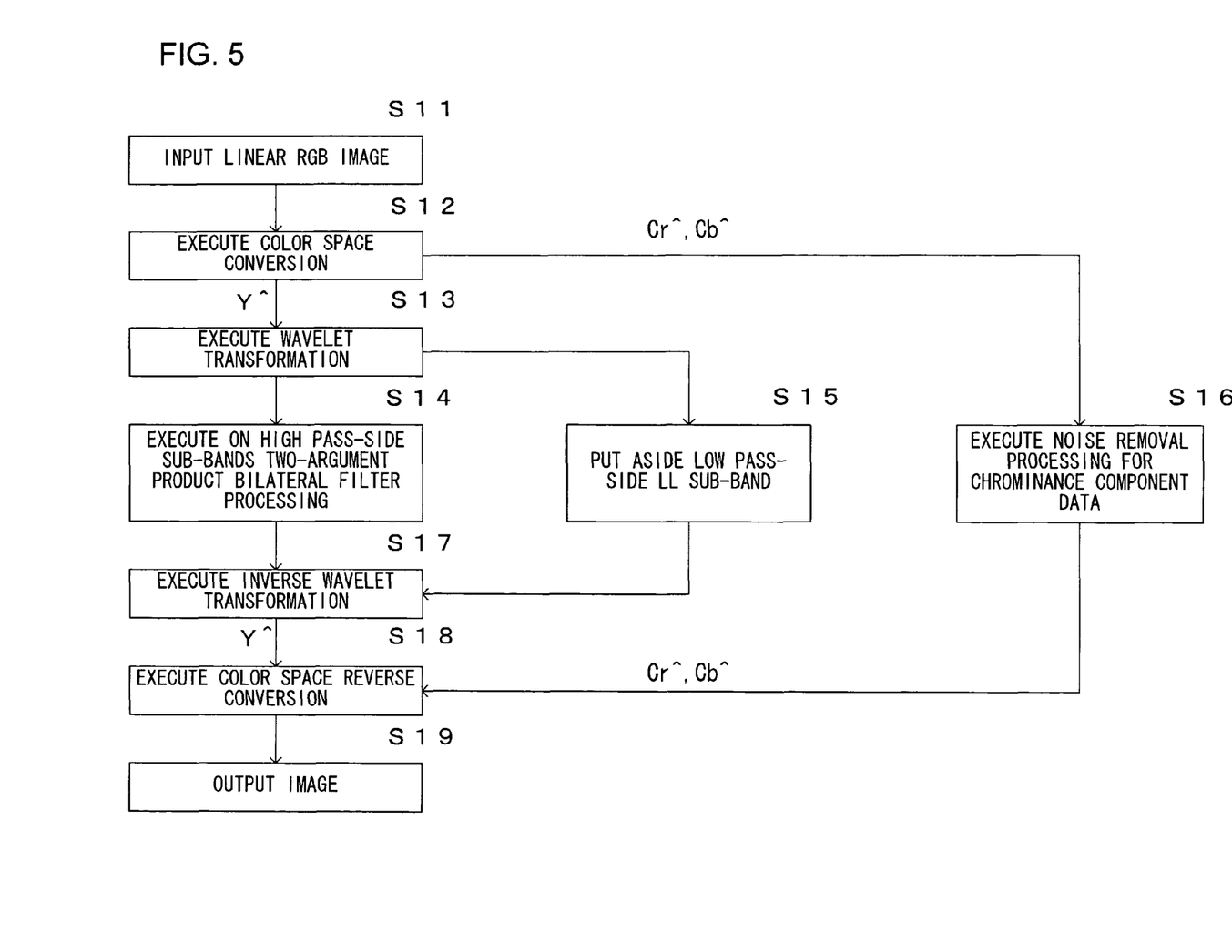

The structure of the image processing apparatus achieved in the second embodiment is similar to that adopted in the first embodiment having been described in reference to FIG. 1 and, accordingly, its explanation is omitted. FIG. 5 presents a flowchart of the image processing executed by the personal computer 1 in the second embodiment.

(1) Image Data Input and Color Space Conversion

In step S11, linear RGB image data are input. In step S12, the image data are converted to the uniform noise color space Y^Cb^Cr^. The processing executed in steps S11 and S12 is identical to that executed in steps S1 and S2 in the first embodiment.

(2) Wavelet Transformation

In step S13, wavelet transformation is executed on the luminance signals. In the wavelet transformation, through which image data are converted to frequency component data, the frequency component in the image is divided into a high-pass component and a low-pass component. In the embodiment, a 5/3 filter is utilized to execute five-stage wavelet transformation. The 5/3 filter generates the low-pass component with a filter having five taps (one-dimension/5 pixels) and generates the high-pass component with a filter having three taps (one-dimensional/3 pixels).

The high-pass component and the low-pass component are generated as (16) and (17) below. In the expressions, n indicates the pixel position and x[ ] indicates the pixel value assumed at the target image undergoing the wavelet transformation. For instance, n assumes a value in the range of 0~49 if 100 pixels are set along the horizontal direction. By extracting the high-pass component and the low-pass component as expressed below, the high-pass component and the low-pass component data at 50 pixels, i.e., half the pixels, are extracted. These data are processed along the horizontal direction and the vertical direction.

High-Pass Component:

$$d[n]=x[2n+1]-(x[2n+2]+x[2n])/2 \quad (16)$$

Low-Pass Component:

$$s[n]=x[2n]+(d[n]+d[n-1])/4 \quad (17)$$

By using the expressions presented above, the wavelet transformation is executed in sequence over five stages, as expressed below.

First-Stage Wavelet Transformation:
LL0(real space)-→LL1, LH1, HL1, HH1
Second-Stage Wavelet Transformation:
LL1-→LL2, LH2, HL2, HH2
Third-Stage Wavelet Transformation:
LL2-→LL3, LH3, HL3, HH3
Fourth Stage Wavelet Transformation:
LL3-→LL4, LH4, HL4, HH4
Fifth-Stage Wavelet Transformation:
LL4-→LL5, LH5, HL5, HH5

Figure 6:
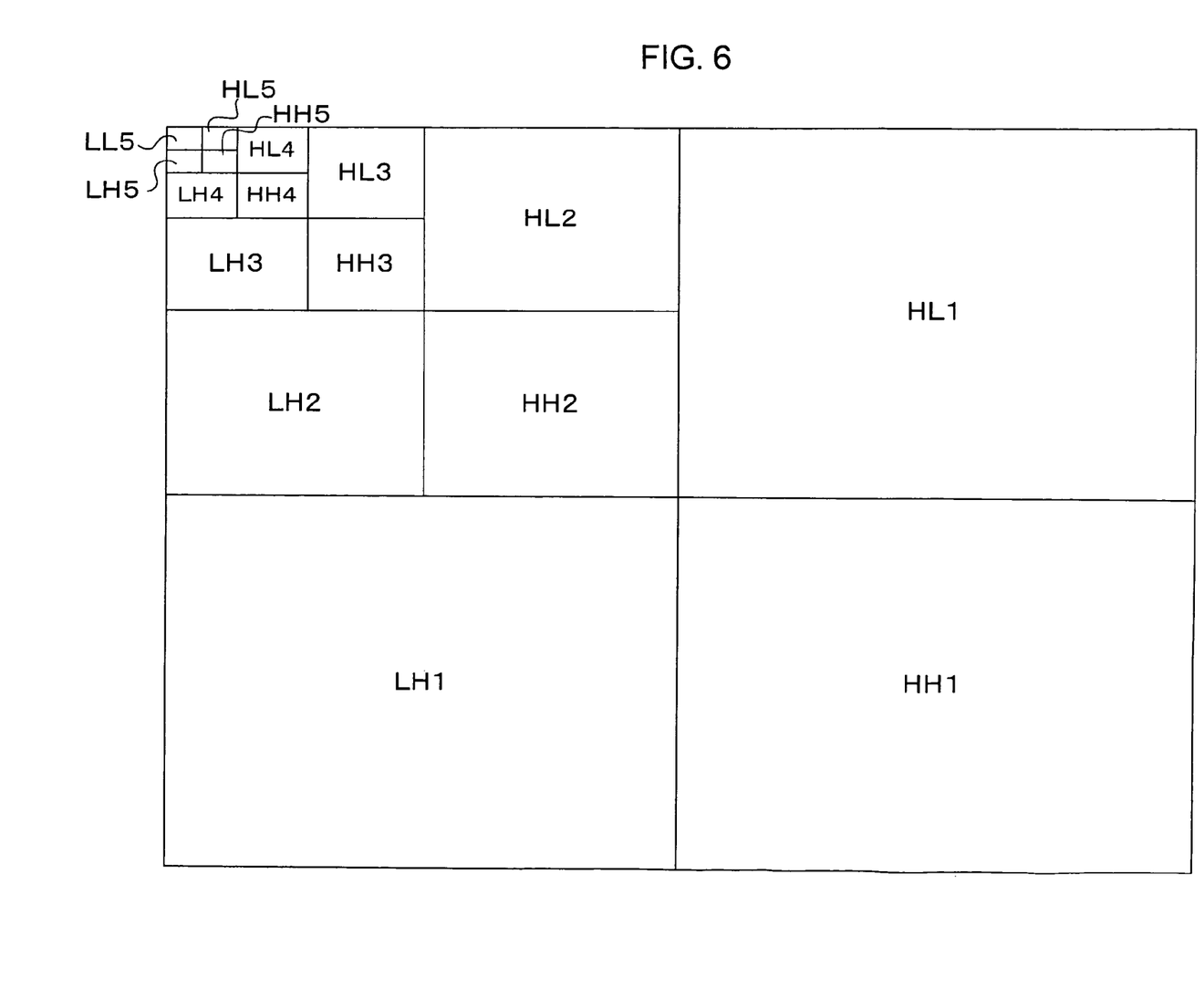

FIG. 6 shows the sub-band partition achieved through the five stage wavelet transformation. For instance, through the first-stage wavelet transformation, high-pass component data and low-pass component data are extracted from the image data in all the rows extending along the horizontal direction in the real space. As a result, high-pass component data and low-pass component data corresponding to half the entire number of pixels are extracted along the horizontal direction. The extracted high-pass component data and low-pass component data may be stored into, for instance, memory areas on the right side and on the left side of the memory area respectively where the image data in the real space have been present.

Next, high-pass component data and low-pass component data are extracted as expressed earlier individually from the high-pass component data having been stored on the right side in the memory area and from the low-pass component data having been stored on the left side in the memory area, along all the columns extending in the vertical direction. As a result, high-pass component data and low-pass component data are extracted both from the high-pass component data stored on the right side in the memory area and from the low-pass component data stored on the left side in the memory area. The high-pass component data and the low-pass component data thus extracted are stored on the bottom side and the top side respectively in the memory area where the corresponding source data have been present.

HH indicates data extracted as high-pass component data along the vertical direction from data having been extracted as high-pass component data along the horizontal direction, HL indicates data extracted as low-pass component data along the vertical direction from the data having been extracted as high-pass component data along the horizontal direction, LH indicates data extracted as high-pass component data along the vertical direction from the data having been extracted as low-pass component data along the horizontal direction and LL indicates data extracted as low-pass component data along the vertical direction from the data having been extracted as low-pass component data along the horizontal direction.

Next, through the second-stage wavelet transformation, high-pass component data and low-pass component data are extracted in a similar manner from the data LL extracted through the first-stage wavelet transformation as low-pass component data along the vertical direction from the data having been extracted as the low-pass component data along the horizontal direction. The partition shown in FIG. 6 is achieved by repeatedly executing the processing described above over five stages.

(3) Noise Removal Processing

Next, noise removal processing, i.e., filter processing, is executed. In step S15, the low-pass side sub-band corresponding to the LL5 component data are set aside. In step S14, the unseparated weighting type bilateral filter as defined in the first embodiment is applied to all the high-pass component data (LH1, HL1, HH1), (LH2, HL2, HH2), (LH3, HL3, HH3), (LH4, HL4, HH4) and (LH5, HL5, HH5), excluding the LL5 component data. At this time, a sufficient effective filtering size can be assured with ease based upon the multi-resolution representation and, for this reason, the processing on each sub-band should be executed by setting rth to 1.0~2.0 (equivalent to approximately 5×5 pixels). Consequently, the processing can be executed at higher speed.

In step S16, the chrominance component data Cb^ and Cr^ undergo the unseparated weighting-type bilateral filter processing defined in the first embodiment.

(4) Inverse Wavelet Transformation

In step S17, the data having undergone the filter processing in steps S14 and S15 undergo inverse wavelet transformation as indicated below.

First-Stage Inverse Wavelet Transformation:
LL5, LH5, HL5, HH5→LL4
Second-Stage Inverse Wavelet Transformation:
LL4, LH4, HL4, HH4→LL3
Third-Stage Inverse Wavelet Transformation:
LL3, LH3, HL3, HH3→LL2
Fourth-Stage Inverse Wavelet Transformation:
LL2, LH2, HL2, HH2→LL1
Fifth-Stage Inverse Wavelet Transformation:
LL1, LH1, HL1, HH1→LL0(real space)
(5) Color space reverse-conversion In step S18, the Y^Cb^Cr^ data are converted back to R'G'B' data and the R'G'B' data are further converted back to RGB data expressed based upon the initial linear gradation, as in the first embodiment.

(6) Image Output

In step S7, the image data from which the noise has been removed are output.

As described above, the image data in the linear gradation RGB color space are first converted to image data in a uniform noise space, and filter processing is executed on the high-pass component data resulting from the wavelet transformation so as to remove noise from the luminance signals. Then, the luminance signals undergo inverse wavelet transformation, color space reverse-conversion is executed on the data from which noise has been removed, and image data reconverted to data in the initial linear gradation RGB color space are output.

The advantages of the embodiment are now explained. Trilateral filter technologies have been proposed as means for addressing the concern with regard to the bilateral filters in the related art, i.e., the noise removal effect over steep image areas is poor. Such a trilateral filter is disclosed in, for instance, reference literature: Prasun Choudhury et al., "Trilateral Filter for High Contrast Images and Meshes," Eurographics Symposium on Rendering 2003, pp 1~11.

However, the tilt component can be removed by generating high-pass component data for, for instance, the luminance component, as has been explained in reference to the embodiment without executing complex additional processing by introducing a third integral factor that would tilt the Gaussian distribution. In addition, since the improved bilateral filter itself, which constitutes the substance of the present invention and is defined as the product of the arguments, sustains a high level of noise removal performance over such steeply inclined areas, desired advantages can be achieved through simpler processing.

(Examples of Variations)

While the color space Y^Cb^Cr^ used in the first embodiment and the second embodiment is a uniform noise space, it does not assure fully realized color uniformity. Accordingly, examples of a uniform noise and pseudo-uniform color space that may be used in conjunction with the present invention are described. By using such a uniform noise and pseudo-uniform color space, better color reproduction is assured compared to the level of color reproduction achieved through the use of the uniform noise space in the first embodiment and the second embodiment. In addition, such a uniform noise and pseudo-uniform color space assures a high level of noise removal performance, comparable to that of the uniform noise space in the related art.

First, the linear gradation RGB colorimetric system data are converted to XYZ calorimetric system data, which are normally used when defining a uniform color space. The conversion expression will vary depending upon the spectral sensitivity distribution characteristics of the color filters used in the image sensor from which the data are input. For instance, CIE RGB colorimetric system data with the reference color stimuli assuming values of 700.0 nm for R, 546.1 nm for G and 435.8 nm for B in a single spectrum may be converted to CIE XYZ colorimetric system data, as expressed below.

$$X = 2.7689R + 1.7517G + 1.1320B \tag{18}$$

$$Y = 1.0000R + 4.5907G + 0.0601B \tag{19}$$

$$Z = +0.0565G + 5.5943B \tag{20}$$

In another example, when handling a color image ultimately expressed in an sRGB color space, the RGB values having been reverted to linear gradation data may be converted to XYZ values as expressed below.

$$X = 0.4124R + 0.3576G + 0.1805B \tag{21}$$

$$Y = 0.2126R + 0.7152G + 0.0722B \tag{22}$$

$$Z = 0.0193R + 0.1192G + 0.9505B \tag{23}$$

Next, the data in the linear gradation XYZ space are converted to data in a nonlinear gradation L^a^b^ space representing a perceptive attribute with a pseudo-uniform color distribution, while retaining the noise uniformity.

$$L\hat{} = 100 * f(Y/Y0) \tag{24}$$

$$a\hat{} = 500 * [f(X/X0) - f(Y/Y0)] \tag{25}$$

$$b\hat{} = 200 * [f(Y/Y0) - f(Z/Z0)] \tag{26}$$

X0, Y0 and Z0 in the expressions above each represent a value determined in correspondence to the illuminating light. For instance, X0, Y0 and Z0 may assume values 95.045, 100.00 and 108.892 respectively in a 2° visual field under standard light D65. In addition, the nonlinear gradation conversion function f( ) is defined in (27) below. It is to be noted that the variable t, expressed as; t=(Y/Y0), t=(X/X0), t=(Z/Z0), assumes a value normalized based upon the maximum value representing the number of gradations for the X,Y and Z values so that the relationships expressed as $0 \leq (Y/Y0) \leq 1$, $0 \leq (X/X0) \leq 1$, $0 \leq (Z/Z0) \leq 1$, are satisfied.

[Expression 27]

$$f(t) = \sqrt{t + \epsilon} \tag{27}$$

If necessary, the origin point and the saturation point may be normalized by using the following expression.

[Expression 8]

$$f(t) = \frac{\sqrt{t+\varepsilon} - \sqrt{\varepsilon}}{\sqrt{1+\varepsilon} - \sqrt{\varepsilon}} \tag{28}$$

$\epsilon$ should assume a value similar to that taken in the first embodiment. Since filter processing similar to that executed in the first embodiment is executed in the uniform noise and pseudo-uniform color space as described above, optimal noise removal is achieved while improving the color reproduction.

The invention claimed is:

1. An image processing method for filtering image data, which is constituted with a plurality of pixels, at each pixel position by using pixel values indicated by pixels present within a predetermined range containing a target pixel, comprising:
   determining two arguments that are a first argument defined by a spatial distance from the target pixel and a second argument defined by a difference in signal intensity relative to the target pixel, in correspondence to each of the pixels present within the predetermined range;

obtaining a weighting coefficient to be used when filtering each of the pixels present within the predetermined range, based upon the first argument and the second argument;

determining the weighting coefficient by ensuring that w(A1,B1)/w(A1,B2)≠w(A2,B1)/w(A2,B2) is true with A1 and A2 representing different values taken for the first argument, B1 and B2 representing different values taken for the second argument, and w(An, Bn) representing the weighting coefficient being obtained; and filtering the image data by using a filter coefficient corresponding to the weighting coefficient having been obtained.

2. An image processing method according to claim 1, wherein:

the weighting coefficient is determined by ensuring that w(A1,B1)/w(A1,B2)<w(A2,B1)/w(A2,B2) is true when 0≦A1<A2 and 0≦B1<B2.

3. An image processing method according to claim 1, wherein:

the first argument and the second argument are integrated with each other to constitute an argument in an exponential function expression representing a single Gaussian distribution.

4. An image processing method for filtering image data V(vector r), which is constituted with a plurality of pixels, at each pixel position by using a pixel value V(vector r') corresponding to a pixel vector r' within a predetermined range containing a target pixel vector r, comprising:

filtering the image data by executing arithmetic operation expressed as $$V'(\vec{r}) = \frac{\int V(\vec{r}) \cdot \exp\left\{-\frac{|V(\vec{r}') - V(\vec{r})|^2}{\sigma_{th}^2} \cdot \frac{|\vec{r}' - \vec{r}|^2}{r_{th}^2}\right\} d\vec{r}'}{\int \exp\left\{-\frac{|V(\vec{r}') - V(\vec{r})|^2}{\sigma_{th}^2} \cdot \frac{|\vec{r}' - \vec{r}|^2}{r_{th}^2}\right\} d\vec{r}'}$$

[Expression 1]

with vector r=r with an arrow above, vector r'=r' with an arrow above, σth and rth respectively representing a constant and vector r indicating a coordinate position of the pixel.

5. An image processing method according to claim 4, wherein:

the predetermined range for filtering is integrated over a range approximately twice rth.

6. A non-transitory computer-readable medium storing a computer program product, comprising:

an image processing program that enables a computer or an image processing apparatus to execute image processing with the image processing method according to claim 1.

7. An image processing apparatus, comprising:

a control device that executes image processing with the image processing method according to claim 1.

* * * * *